INVENTORS:
HANS SCHOLL,
GÜNTHER HAGEMAYER
by Jacob L. Kollin
ATTORNEY

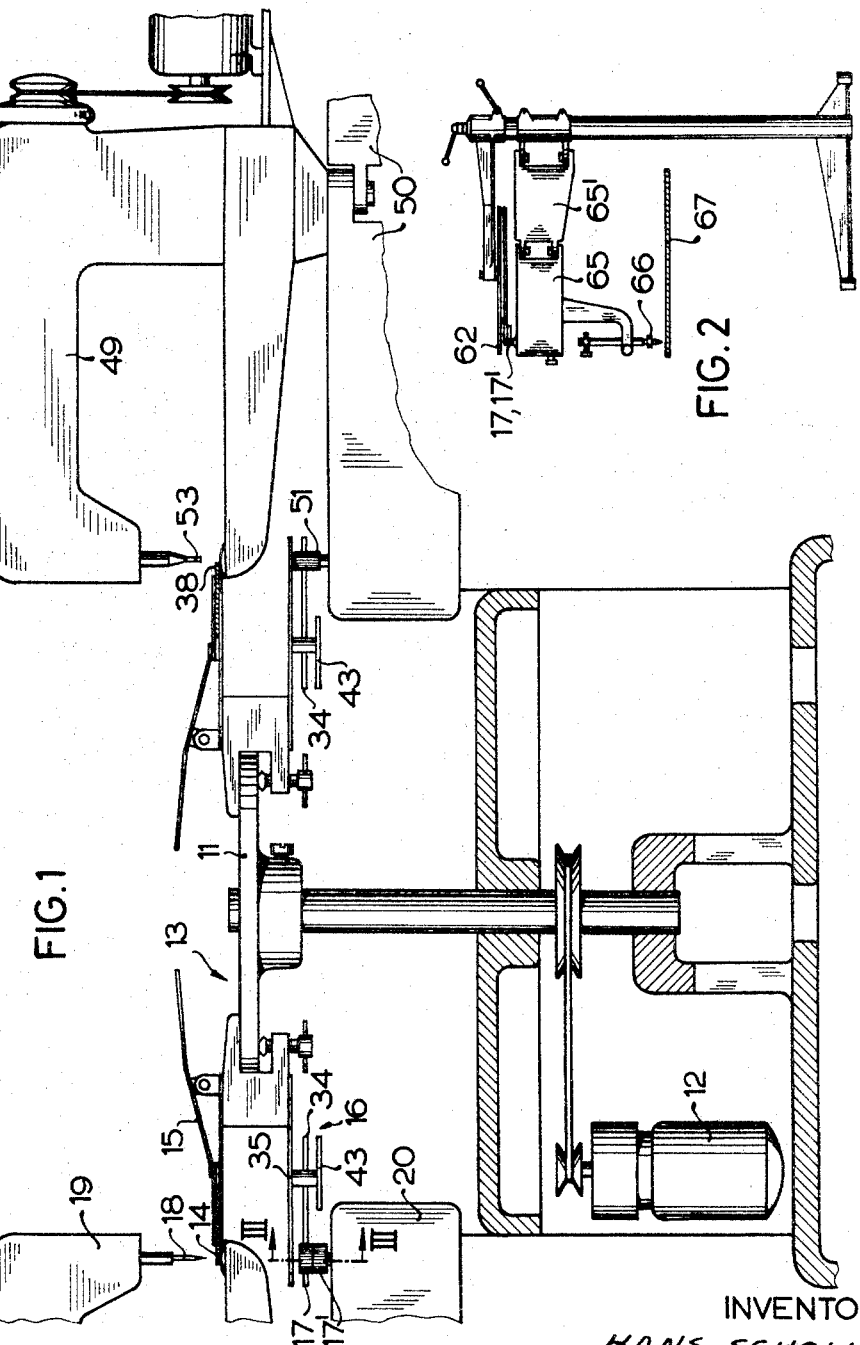

March 25, 1969     H. SCHOLL ET AL     3,434,370
STENCIL CONTROL FOR PRODUCTION MACHINES, SUCH AS SEWING
MACHINES, BY MEANS OF DRIVEN ROLLERS
Filed Aug. 9, 1966
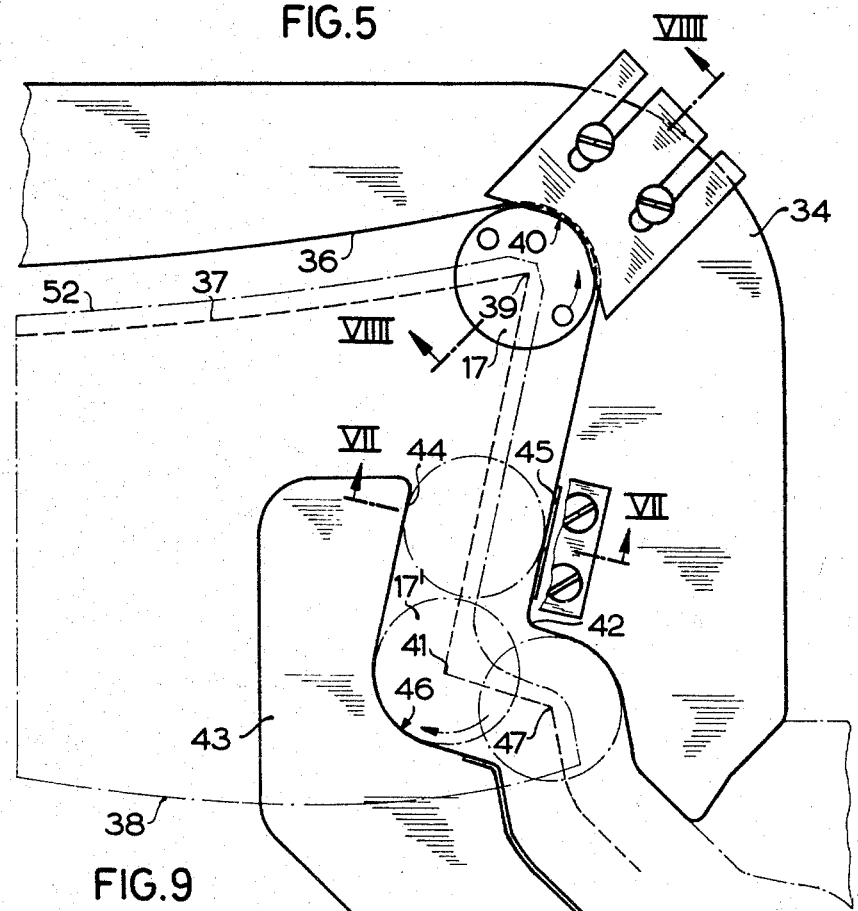
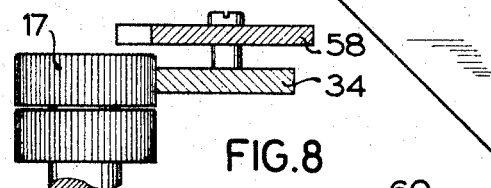
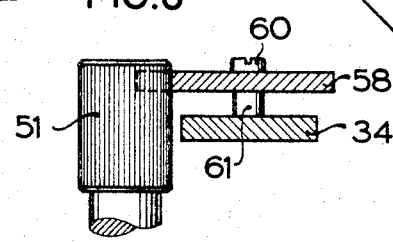
INVENTORS:
HANS SCHOLL,
GÜNTHER HAGEMAYER
by Jacob L. Kollin
ATTORNEY United States Patent Office 3,434,370
Patented Mar. 25, 1969

3,434,370
STENCIL CONTROL FOR PRODUCTION MACHINES, SUCH AS SEWING MACHINES, BY MEANS OF DRIVEN ROLLERS
Hans Scholl, Bielefeld, and Günther Hagemayer, Leopoldshohe, Kreis Lemgo, Germany, assignors to Kochs Adlernahmaschinen-Werke AG., Bielefeld, Germany
Filed Aug. 9, 1966, Ser. No. 571,328
Claims priority, application Germany, Sept. 10, 1965, K 56,864
Int. Cl. F16h 53/06
U.S. Cl. 74—569          7 Claims

ABSTRACT OF THE DISCLOSURE

A device for the automatic sewing and trimming of fabric workpieces or fusing of sheet material held in clamping or holding frames according to the outline of pattern made to correspond with the workpieces and driven about by means of driven magnetic rollers. This device is provided with pattern means and auxiliary patterns cooperating with magnetic rollers driven by reverse drive means, for producing sharp-angled seams or edges on a workpiece, or when the occasion arises to allow the employment of a second process by a second working machine provided with driven magnetic rollers of other measurements cooperating with the main patterns only.

The invention relates to a device for the automatic sewing, fusing and cutting out of workpieces held in clamping or holding frames according to the outline of pattern made to correspond with the workpieces and driven about by means of driven magnetic rollers. Devices of this kind are known. Thus, German patent application No. Sch 3,703 disclosed an automatic working control for sewing machine in which a pattern having the shape of the seam to be sewn rides automatically about a magnetic roller in order to make possible the production of the desired seams by the sewing machine.

There is further known an automatic sewing device controlled by a pattern in which, in a continuous work cycle, workpieces, disposed in workpiece holders on a rotatable table, are first cut by a trimming machine and finally are provided with a seam by a sewing machine. In this device both machines are provided with magnetic rollers of different diameters for riding about the patterns. Thus the magnetic roller of the trimming machine has a smaller diameter than that of the sewing machine, which is necessary when similar patterns are used for both machines, in order to sew the seams with the desired spacing from the trimmed edge of the workpiece.

Pattern controls operated with magnetic rollers have been used for a long time for metal processing machines for flame cutting of steel plates by means of oxyacetylene torches.

In these known devices for making workpieces according to a pattern driven by magnetic rollers it has heretofore not been possible to produce desirable small curvature radii. For example, when working with a positive pattern in which the magnetic roller travels about the outer edge, the smallest possible curvature radius of the workpiece is equal to the radius of the magnetic roller, to the extent that the workpiece has inner curves in which the direction of the trim is toward the middle point of the workpiece. Curvature radii with a "zero" value can only be achieved in a workpiece when a positive pattern with an outer curve is used, and in which the curvature radii are equal to the radius of the magnetic roller.

In negative patterns there are present inverse proportions when the magnetic roller rolls on the inner edge. In this instance it is possible to produce workpieces with zero curvature radii only in the area of the outer curves of the pattern.

When working with a row of workpieces of different types, for example with shirt collars, it is necessary to deflect the seams angularly or outwardly without a radius. This requirement cannot be met with known devices.

The object of the invention is to overcome the still inherent deficiencies in known devices and to basically provide a device for the automatic sewing, fusing, trimming or flame cutting of workpiece held in clamps or holding frames which are to be provided with any desired outer contour or seams and which are rolled about by means of driven magnetic rollers and which make it possible to produce not only outer but also inner curves in a workpiece with a "zero" radius or with any other desired radius.

This problem is substantially solved, according to the invention, by providing a pair of upper and lower coaxially mounted, oppositely driven magnetic rollers and exchangeable patterns cooperating therewith. The upper of these coaxially mounted magnetic rollers is secured to its driving shaft, while the lower magnetic roller is associated with this shaft by means of an inverse drive.

The inverse drive may consist of a bevel gear secured to the drive shaft, the lower roller having a beveled gear portion engaging with the bevel gear through a pair of intermediate bevel gears, said lower roller being rotatable about the drive shaft.

The pattern may be designed in such a manner, that an auxiliary pattern may be secured or adapted to a section of the main pattern having an inner curve, said auxiliary pattern likewise having an inner curve which abuts the lower oppositely moving magnetic roller after the upper roller has been inactivated for the purpose of producing a small curvature radius or an angularly extending workpiece contour.

Inserts of non-magnetic material are mounted on the forward surfaces of the patterns to neutralize the effect of the magnetic rollers at these positions of the patterns for the purpose of transfering the other magnetic rollers to the auxiliary pattern, or vice-versa.

The inserts of non-magnetic material which are mounted in the patterns may be bridged over by means of rims made of ferro-magnetic material, in order to prevent the transfer of a magnetic roller from this pattern to the auxiliary pattern.

A sheet metal guide for the magnetic roller may be displacably secured to the pattern in the area of its inner curve, in order to carry out two different working cycles with the same pattern in a continuous cycle by means of a pair of production machines having magnetic rollers of different diameter and height.

The invention is illustrated by way of embodiment examples in the drawings.

In the drawings:

FIG. 1 is an automatic sewing installation controlled by patterns for producing collars or other small parts in a continuous manner, with a trimming machine for the workpiece edges and a sewing machine for producing seams, shown in side elevation;

FIG. 2 is a flame cutting machine controlled by a pattern for flame cutting of workpieces from steel plates or the like, shown in side elevation;

FIG. 5 is a partial plan view of the device shown in FIG. 1, illustrating on an enlarged scale a part of the main and auxiliary patterns cooperating with the magnetic rollers of the sewing machine;

FIG. 8 is a section on line 8—8 of FIG. 6;

FIG. 9 is a section on line 9—9 of FIG. 5;

Figure 3:
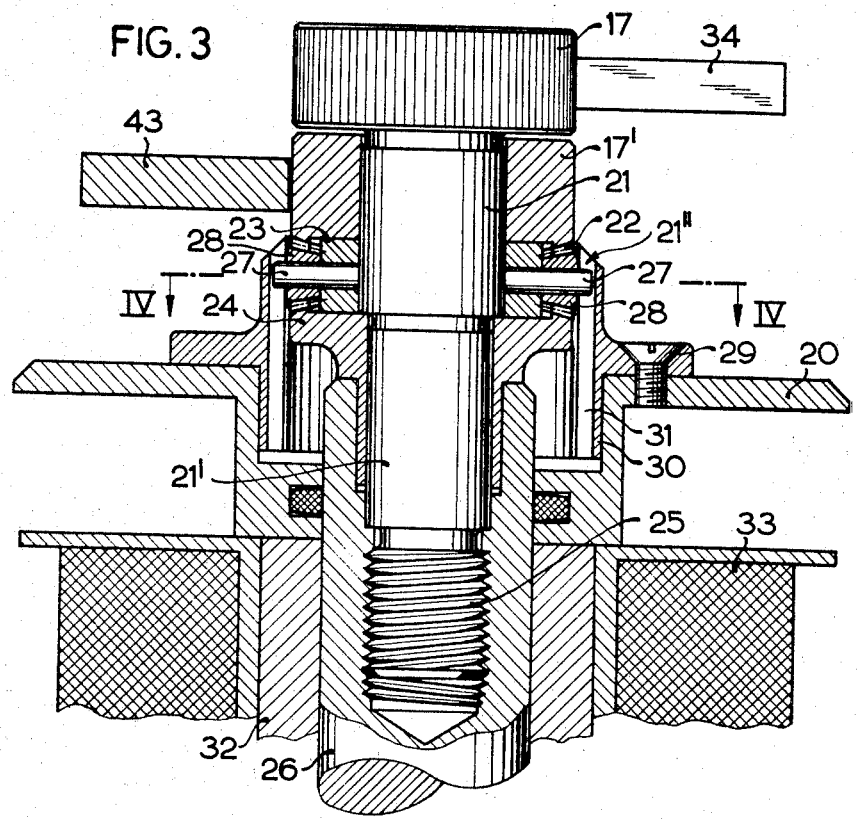
FIG. 3 is a pair of oppositely, rotatably driven magnetic rollers shown in cross-section taken on line 3—3 of FIG. 1, on an enlarged scale.

The automatic sewing installation, shown in FIG. 1, is of known construction. Exchangeable workpiece holders 13 are clamped on a rotatable table 11, which is driven intermittently by a motor 12, and in which the workpieces 14 are held by means of clamps 15, the other side of the table having patterns 16 secured thereto. Magnetic rollers 17, 17' about these and are driven by a drive device (not shown) in a swinging arm 20, which carries the sewing machine. The needle 18 of the sewing machine 19 extends in the same axial direction as the magnetic rollers 17, 17'.

Figure 4:
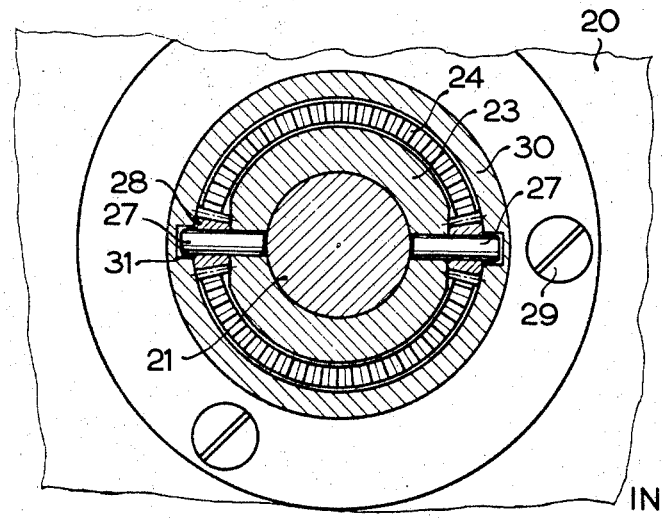
FIG. 4 is a section taken on line 4—4 of FIG. 3.

As may be best seen in FIGS. 3 and 4, two oppositely driven magnetic rollers 17 and 17' are driven by means of reverse drives 21'₂. The upper magnetic roller 17 is constructed with a cylindrical shaft 21 on which is mounted a lower magnetic roller 17' provided with teeth 22, and an intermediate ring 23.

A spur bevel gear 24 is mounted on the elongated shaft portion 21', which is of smaller diameter and which is secured by thread 25 to a drive shaft 26. A pair of bevel gears 28 are rotatably mounted on a pair of shafts 27 inserted in the intermediate ring 23, said double gears meshing with the teeth of the spur bevel gear 24 and its lower magnetic roller 17'. Recesses 31 are provided in a guide sleeve 30 which is secured in a swinging arm 20 by means of screws 29, and into these recesses extend the overlying ends of the shaft 27, in order to prevent a rotation of the intermediate ring 23 with the shafts 27. The drive shaft 26 for the magnetic rollers 17 and 17' which is in operative connection with a drive motor (not shown), is rotatably mounted, in known manner, in the magnet core provided with a magnet coil 33. The outer magnetic roller 17 abuts against a main pattern 34, as may be seen in FIGS. 1, 3, 5, 7 and 9, said pattern being secured to a pattern holder 35 (FIG. 1), associated with the workpiece holder 13. The pattern is constructed as a so-called negative pattern on the inner side 36 of which rides a magnetic roller 17 for sewing a seam 37, shown in dotted lines in FIG. 5, on a sewing machine 19, for example a shirt collar 38. In order to form a wedge-shaped seam, such as is illustrated at 39 (FIG. 5), the inner edge 40 of the main pattern 34 must have a radius corresponding to the magnetic roller 17. Should a change of direction be given to the course of the seam using a "zero" radius, as shown at 41, it would not be possible to produce this radius with the outer curve 42 provided in this part of the main pattern. Only in a most favorable case, with a "zero" radius of the outer curve 42 would it be possible to have a curve-shaped course of the seam 37 by means of the magnetic roller 17 with a radius corresponding to the magnetic roller 17.

In order to overcome this shortcoming, there is secured to the pattern holder 25 a negative auxiliary pattern 43 which is oppositely disposed to the negative main pattern 34 (FIG. 1). It is disposed below the plane of the main pattern 34, so that it may operatively engage with the lower oppositely rotatable magnetic roller 17', when it reaches the area of the inner edge 44 of the auxiliary pattern 43. The magnetic field of the upper magnetic roller 17 is thus weakened by means of an insert 45 of non-magnetic material, for example brass, disposed on the main pattern 34, in such a manner that the magnetic roller 17 is lifted off the main pattern 34 under the now full starting torque of the lower magnetic roller 17', thus making it ineffective.

The further movement of the sewing machine 19 therefore follows the magnetic roller 17', riding on the inner edge 44 of the auxiliary pattern 43 in the direction of the arrow. The auxiliary pattern 43 describes an inner course 46 with a radius of the magnetic roller 17', for reorienting the course of the seam at 41.

At 47 a new change of direction of the seam 37 must take place. For this purpose there is provided in the auxiliary pattern 43 an insert 48 of a non-magnetic material, which causes the guidance to be transferred to the main pattern 34, whereby an advance, by means of the magnetic roller 17, is effected.

In the automatic sewing installation illustrated in FIG. 1 there is built in a trimming machine 49 which is secured on a swinging arm 50 in the same manner as the sewing machine 19 and which rides, by means of a magnetic roller 51, on the inner edge 36 of the main pattern 34, in order to trim the collar 38 (FIG. 6) along the dot and dash line 52 by means of a knife 53.

Figure 10:
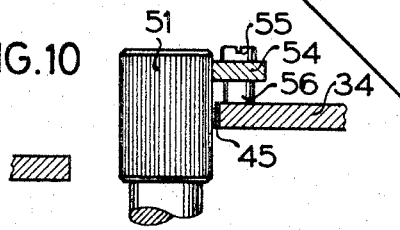
FIG. 10 is a section approximately on line 10—10 of FIG. 6.
Figure 7:
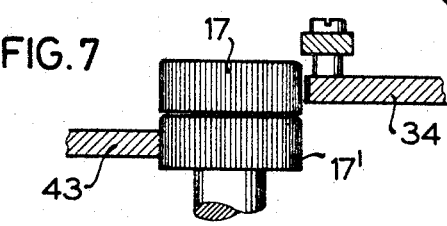
FIG. 7 is a section approximately on line 7—7 of FIG. 5.
Figure 11:
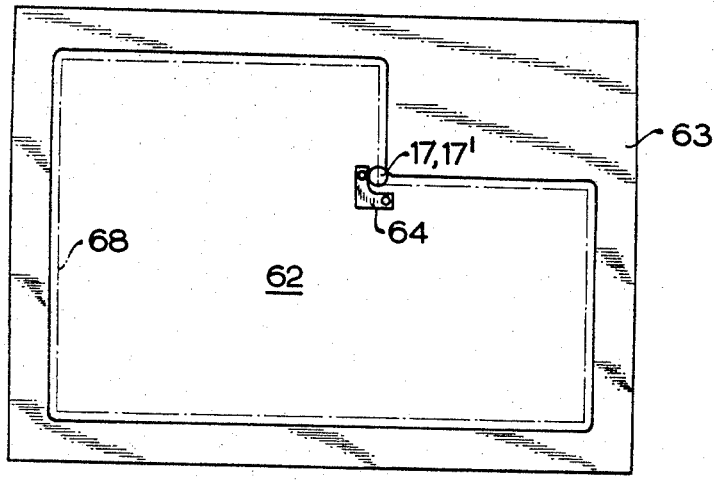
FIG. 11 is a negative pattern shown in the flame cutting machine of FIG. 2 and used therein with an auxiliary pattern for sharp angle flame cutting of a workpiece.

A rim 54 of ferro-magnetic material (FIGS. 6, 10) is secured, by means of screws 55 and spacer means 56, to the main pattern 34 in the area of the insert 45. As may be seen in FIGS. 7 and 10, the magnetic roller 51 has a smaller diameter than the magnetic rollers 17, 17'; it likewise has no oppositely running roller, since only the inner edge 36 of the main pattern 34 is contacted by the magnetic roller 51. It is of such length, that already before the rolling over the unmagnetized insert 45, the magnetic roller 51 abuts the rim 54 for bridging over the latter to the ineffective zone of the main pattern 34.

Figure 6:
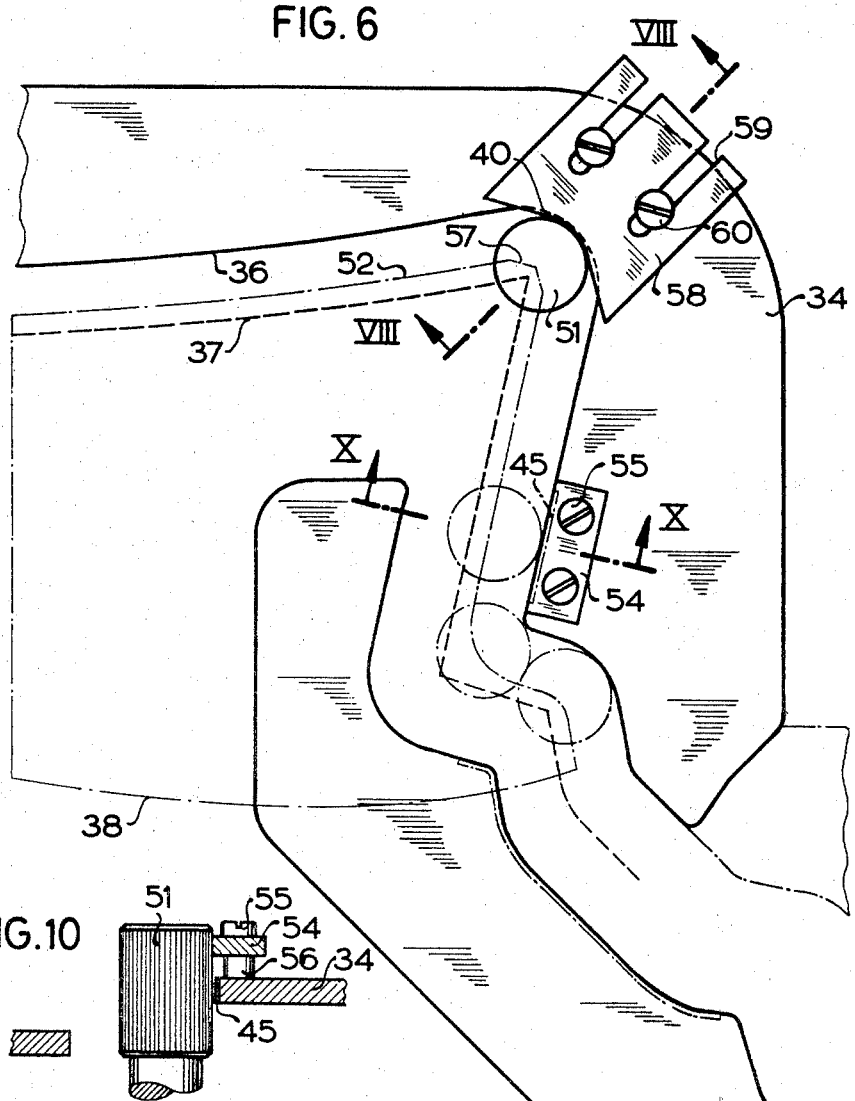
FIG. 6 is a similar plan view of the patterns cooperating with the magnetic roller of the trimming machine.

For industrial production reasons, it is frequently necessary, in manufacturing apparel pieces, to have the line 52 of the trimmed edge of a piece 38 assume a course other than the seam 37, for example an angular course, as is illustrated at 57 in FIG. 6. For this purpose there is provided, in the area of the inner course 40 of the main pattern 34, a sheet metal guide (FIGS. 8 and 9) which is secured to the pattern 34 in slots 59 in a displaceable manner, by means of screws 60 and spacer sleeves 61 in the same plane as the rim 54.

A further possibility of employing the device according to the invention is illustrated in FIGS. 2, 11, 12 and 13. A negative pattern 63 (FIG. 11) and a similar negative auxiliary pattern 64 are secured on a pattern carrying plate 62 of an autogenous flame cutting machine (FIG. 2). By means of burners secured to swinging arms 65, 65' linked to one another and by means of the driven magnetic rollers 17, 17', it is possible to flame cut a workpiece having a contour 68 indicated in FIG. 11 by a dot and dash line, out of a plate 67, whereby all the curvature radii may have a "zero" value, due to the design of the patterns 63, 64.

Figure 12:
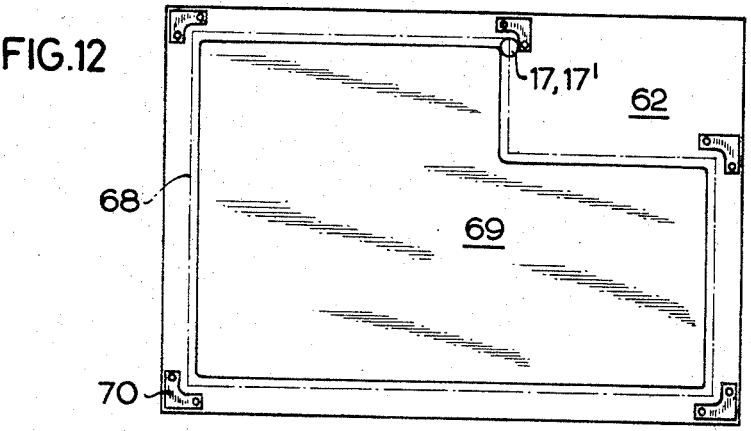
FIG. 12 is a positive pattern with auxiliary patterns, likewise for sharp angle or flame burning of a workpiece from a plate.
Figure 13:
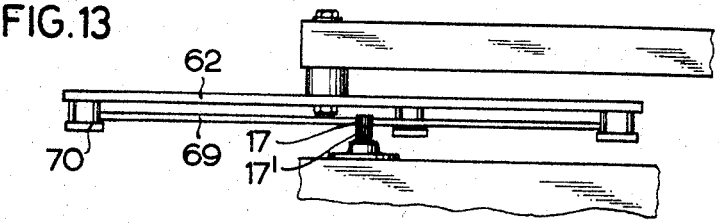
FIG. 13 is a side view of the pattern shown in FIG. 12.

As may be seen in FIG. 12, the same shape may be produced by means of a positive main pattern 69 and four negative auxiliary patterns 70 with the already described magnetic rollers 17, 17'.

We claim:

1. Device for the automatic sewing, trimming or flame burning of workpieces held in clamping frames, comprising pattern means, magnetic roller means for guiding said pattern means, said magnetic roller means comprising a driven shaft pair of upper and lower coaxially mounted, oppositely driven magnetic rollers cooperating with said pattern means, the upper of said rollers rigidly secured to said driven shaft and rotatable with said shaft, the lower of said rollers being rotatable on said shaft counter to the rotational direction of said shaft, reverse drive means on said shaft for rotating the lower roller in direction counter to the direction of rotation of the upper roller, said reverse drive comprising a spur bevel gear secured to said shaft, a pair of bevel pinion gears on said lower roller engaging with said gear and shaft means for said pinion gears.

2. Device according to claim 1, wherein said upper magnetic roller is formed with a cylindrical shaft portion, said lower magnetic roller being rotatably mounted about said cylindrical portion, an intermediate ring being provided between said upper and lower magnetic rollers.

3. Device according to claim 2, further provided with a guide sleeve for said spur bevel gear, said guide sleeve having a pair of oppositely disposed slots, said shaft means for said reverse pinion gears being received in said slots, for preventing the lateral displacement of said pinion gears.

4. Device according to claim 1, wherein said pattern means comprises a main pattern having a section provided with an inner curved portion, an auxiliary pattern having an inner curved portion secured to said main pattern, said lower roller engaging the inner curved portion of said auxiliary pattern when said upper roller in deactivated, for effecting a small curvature radius or angular contour.

5. Device according to claim 4, wherein said patterns are further provided with inserts of non-magnetic material, for transferring the respective magnetic rollers to the corresponding patterns.

6. Device according to claim 5 wherein said inserts are further bridged with rims of ferro-magnetic material for preventing the transfer of the main pattern to the auxiliary pattern.

7. Device for the automatic sewing and trimming of workpieces held in clamping frames, said device comprising a sewing machine, a trimming machine, pattern means of magnetic material, a driven shaft in said sewing machine, upper and lower coaxially mounted oppositely driven magnetic rollers on said shaft cooperating with said pattern means, the upper of said rollers rigidly secured to said shaft, means for rotating the lower roller in a direction opposite to that of the upper shaft, auxiliary patterns arranged on the under side of said pattern means and cooperating with said lower magnetic roller, said pattern means and said auxiliary patterns being provided with curved portions and inserts of non-magnetic material, for transferring said respective upper and lower magnetic rollers to the corresponding patterns, an elongated driven magnetic roller secured to said trimming machine, said elongated roller being at a smaller diameter but of greater length than said pair of magnetic rollers for cooperating with said pattern means and for carrying out successively two different processing steps in one working operation, said inserts of non-magnetic material being bridged by a rim of magnetic material arranged above said pattern means and adapted to cooperate with said elongated roller, for preventing the transfer of said elongated roller from said pattern means to said auxiliary pattern.

References Cited

FOREIGN PATENTS 582,144    8/1959    Canada.
1,199,597    8/1965    Germany.

FRED C. MATTERN, JR., *Primary Examiner.*

F. D. SHOEMAKER, *Assistant Examiner.*

U.S. Cl. X.R.

33—23; 112—102; 266—23